Figure 1:
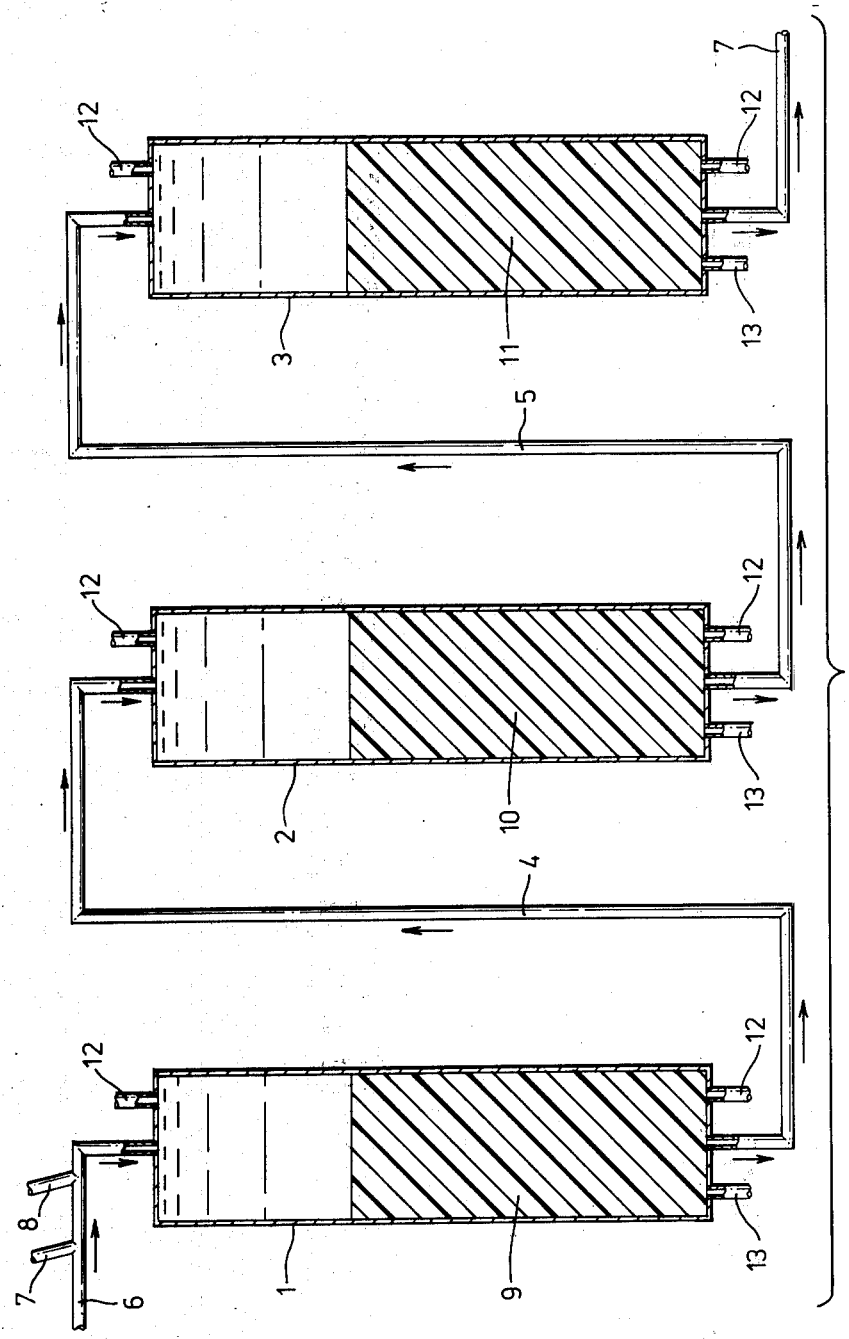

United States Patent [19]

Smith et al.

[11] 4,336,140

[45] Jun. 22, 1982

[54] WATER PURIFICATION PROCESS

[75] Inventors: Joseph H. Smith; Trevor A. Peploe, both of London, England

[73] Assignee: Permutit-Boby Limited, Laverstoke Mill, England

[21] Appl. No.: 186,921

[22] Filed: Sep. 12, 1980

Related U.S. Application Data

[63] Continuation-in-part of Ser. No. 963,712, Nov. 27, 1978, abandoned.

[30] Foreign Application Priority Data

Nov. 30, 1977 [GB] United Kingdom .............. 49770/77
Oct. 7, 1978 [GB] United Kingdom .............. 39714/78
Mar. 24, 1980 [AU] Australia ............................ 56783/80

[51] Int. Cl.³ .............................................. B01D 15/04
[52] U.S. Cl. ..................................... 210/677; 210/685
[58] Field of Search .............. 210/274, 283, 284, 677, 210/685, 670; 521/26

[56] References Cited

U.S. PATENT DOCUMENTS

| 2,510,855 | 6/1950 | Bauman | 210/677 |
| 3,455,819 | 7/1969 | Crits | 210/274 |
| 3,497,069 | 2/1970 | Lindenthal et al. | 210/283 |
| 3,849,306 | 11/1974 | Anderson | 210/685 |

Primary Examiner—Ivars C. Cintins
Attorney, Agent, or Firm—Lawrence Rosen

[57] ABSTRACT

Water of low solids content is purified by ion exchange treatment in separate beds with anion and cation exchange resins, the rate of flow of water through the last bed at least being fast. The beds are usually shallow and the flow rate through the last bed at least, and generally through all the beds, is at least 100 meters per hour. Apparatus suitable for use in such a process comprises a tower including supports for holding the beds one above the other and means for passing the water to be treated vertically through the tower.

10 Claims, 2 Drawing Figures

WATER PURIFICATION PROCESS

This application is a continuation in part of our application Ser. No. 963,712 filed Nov. 27, 1978, now abandoned.

This invention relates to the purification by ion exchange of water that is already of low solids content. For instance it will normally have a total dissolved solids content of below 10 mg/l (10 parts per million).

Typical water of this very low solids content is condensate and methods of purifying such water are known and are often termed condensate polishing processes. Traditional condensate polishing processes have aimed at the production of final dissolved solids contents of 5 to 50 µg/l (parts per billion) and in practice it has been substantially impossible to obtain values below 5 µg/l.

Ion exchange processes were initially developed for the purification of water containing relatively high dissolved solids contents, e.g. above 20 mg/l, and it is known that these conventional demineralisation ion exchange processes, which have been used for very many years, may be conducted using various combinations of anion and cation exchange resins. Mixed bed systems, in which the bed is a mixture of anion exchange resin and cation exchange resin, were long ago accepted as being very advantageous for some purposes. When condensate polishing processes began to be developed many years ago mixed bed systems were selected for them and they have been used almost without exception for all condensate polishing processes ever since. Thus there were some proposals to pass the water first through a bed of cation exchange resin and then through a mixed bed but commercially most condensate polishing processes have merely involved the use of a mixed bed. Traditionally the bed is at least 1 meter deep and if very low impurity levels are required the bed is generally deeper.

The only serious proposals of which we are aware for conducting a condensate polishing system without a mixed bed are in U.S. Pat. Specification No. 3,849,306 and at pages 825 to 830 of Volume 37 of the Proceedings of the American Power Conference 1975 (by Shivers, Schmidt and Newberry) to conduct a condensate polishing process using a cation unit followed by an anion unit. However the authors do remark that the mixed bed units gave better effluent and that the two bed system did have some other shortcomings. For instance they state the process incurred increased pressure drop due to the deeper beds that were used in the two bed system as opposed to the mixed bed system.

In U.S. Pat. No. 3,849,306 the flow rates are conventional flow rates and the purity levels are adequate for many purposes, but not as good as we require now.

Users of extremely pure water continually request even lower impurity levels. For instance in modern power stations such as those involving pressurised water reactors or advanced gas cooled reactors the users may now ask for total dissolved solids contents of less than 5 µg/l, for instance a total dissolved sodium ion of less than 1 µg/l and similar figures for sulphate and chloride ions.

The situation is further complicated by the desire, of power stations in particular, to use water having high pH as a result of having been dosed with ammonia or other nitrogenous base since this constitutes a heavy load on an orthodox hydrogen-hydroxide form mixed bed. This causes considerable interest in the operation of mixed beds in the $NH_4OH$ form with their concomitant additional difficulties in meeting the very low sodium, sulphate, and chloride figures each of less than 1 µg/l.

Particularly serious problems are also liable to arise when sea water is used for the indirect cooling of condensate since even minute leakage of sea water into the condensate will give a large increase in the dissolved solids content of the condensate.

Although it has long been recognised that the mixed bed is the best system for condensate polishing it has also long been recognised that the use of the mixed bed creates problems which have to be solved, and a lot of effort has been put into solving these problems.

The principle disadvantage of mixed bed operation for removal down to the very low levels now required is the very fact that it requires intimate mixing of the two ion exchange materials, followed by very complete unmixing for regeneration purposes. If separation prior to regeneration is not absolutely complete, there will be some cation resin entrained in the main body of the anion resin and vice versa. During regeneration any cation resin in the anion resin component will be contacted with caustic soda and converted to the sodium form, and similarly any anion resin in the main body of the cation resin will be contacted with an acid, typically sulphuric or hydrochloric, and will thus be converted to that ionic form.

Since the final quality of treated water depends on the equilibrium between the resin phase and the aqueous phase, this cross contamination can make it difficult, if not impossible, to reach the very low levels currently required, particularly when operating in the ammonium hydroxide form.

This intrinsic disadvantage of mixed bed operation has been much researched and various schemes have been used to ameliorate the problem. There have been two main directions of research, the first being to improve the separation techniques by the incorporation of a third inert material into the mix, or by chemical separation of the two resins by use of an aqueous solution of relatively high specific gravity, typically caustic soda.

Alternatively, a certain degree of "cross contamination" is accepted as inevitable, and steps taken to remove the offending ions by chemical means, typically involving recycling of ammonia or lime solutions through the resins at certain stages of the regeneration procedure.

Despite all this effort into solving the problems that are incurred in a mixed bed process no more radical way of overcoming the problems has heretofore been suggested and indeed Shivers et al in the aforementioned article state that the mixed bed system gave better effluent than the two bed system they described.

We have now realised that if a fundamentally different approach to the attainment of very low impurity levels is adopted and if one rejects much of the conventional thinking on ion exchange, such as the desirability of mixed beds and increasing bed thickness for low impurity levels, it is possible to devise a process capable of giving much lower impurity levels than those that were conveniently available previously. For instance whereas previously it was difficult to achieve dissolved solids levels below 20 µg/l it is possible so to operate in accordance with the invention as to achieve dissolved solids contents of below 1 µg/l.

In its broadest aspect, the invention comprises a process of purifying water of low solids content by ion exchange treatment in separate beds with a cation exchange resin and an anion exchange resin, the water being passed through a bed of anion exchange resin and then being passed at a flow rate of above 100 bed volumes per hour through a bed of cation exchange resin. Thus instead of having the cation and anion exchange resins in a mixed bed they are kept in separate beds, with the cation exchange resin following the anion exchange resin and with the flow rate through the cation exchange resin bed at least being fast.

Preferably the flow rate through the cation exchange resin bed is above 120 bed volumes per hour, and preferably the flow rate through the anion exchange resin is also fast, above 100 or 120 bv/hr.

Whereas in the prior art additional purity was generally considered to require additional depth of bed an important feature of the invention is that the high degree of purity is best obtained with relatively shallow beds. Thus each bed is generally less than 1 meter deep and most preferably less than about 75 cm. Naturally there must be sufficient bed thickness to achieve the desired purification and the depth will generally be at least 20 cm.

The cation bed is generally the final bed in the process, the anion bed may be the first bed and it is possible to operate a two bed process as described above to obtain a total dissolved solids content in the effluent of, for instance, 5 $\mu$g/l or less. However problems can arise due to the contact of the condensate or other low solids content water initially with the anion exchange resin bed and, depending upon the nature of the water, these difficulties may prevent the attainment of the optimum very low impurity levels in a two bed process.

An important and highly preferred aspect of the invention is one in which these difficulties are reduced by passing the water first through a separate bed of cation exchange resin before passing it through the bed of anion exchange resin, preferably at a fast rate.

A particularly preferred process according to the invention comprises passing the water of low solids content through a bed of cation exchange resin and then through a separate bed of anion exchange resin and then through a separate bed of cation exchange resin, the flow rate through each bed being above 100 meters per hour. By this process it is easily possible to achieve a quantity of dissolved solids in the treated water of below 5 $\mu$g/l and even below 1 $\mu$g/l. For instance a total dissolved solids content of as low as 0.1 $\mu$g/l is obtainable by this process.

The flow rate through the final cation bed, and preferably also through the other bed or beds, may be about 120 meters per hour or above, for instance up to 300 meters per hour. Generally it is from 120 to 240 meters per hour, most preferably 120 to 150 meters per hour. Expressed in terms of bed volumes the flow rate is preferably above 120 bv/hr often 150 to 200 bv/hr or higher for instance up to 500 bv/hr, often about 360 bv/hr. Each bed is usually less than 1 m preferably less than 75 cm deep and when there are three beds the total depth of the two cation beds is preferably about the same as the depth of the anion bed. For instance each cation bed may be half the depth of the anion bed. Conveniently the anion bed is 50 to 75 cm deep and each cation bed is 25 to 40 cm deep.

The cation and anion resins are maintained in separate beds. Thus the cation resin is regenerated independently of the anion resin and normally separate beds of cation resin are regenerated independently of each other. Thus the anion and cation resins are never mixed and so optimum regeneration of each individually can be achieved and the cross contamination that has previously been accepted as inevitable, and which is a major cause of impurities in the final effluent, is totally avoided.

Regeneration can be by conventional reagents, with the cation resin being regenerated with, for instance, hydrochloric acid or sulphuric acid and the anion resin being regenerated with sodium hydroxide, but it is preferred to regenerate the anion resin in two stages, for instance by treatment with sodium carbonate or bicarbonate and then by treatment with sodium hydroxide, which is generally passed through the bed being regenerated in the same direction as the sodium carbonate or bicarbonate. Preferably the amount of sodium carbonate is from 10 to 90%, usually 10 to 50%, on a dry weight basis of the total amount of sodium carbonate plus sodium hydroxide and is generally from 10 to 50 grams dry weight per liter of anion exchange resin. The sodium carbonate or bicarbonate solution used for the first stage of the regeneration preferably has a concentration of from 1 to 5%, with about 2% being optimum. The sodium hydroxide solution preferably has a concentration of 4 to 6%.

When the process involves the use of two beds of cation exchange resin it is preferred to regenerate the bed of cation exchange resin through which the service flow of water passes first with regenerant that has already passed through the other bed of cation exchange resin.

Regeneration is preferably conducted by passage of sulphuric acid through the final cation resin bed and then through the anion resin bed, and generally if there is a first cation resin bed the used sulphuric regenerant from the anion bed is then passed through that first bed in order to regenerate that. Each of the beds may be contained in a separate regeneration vessel but preferably regeneration is conducted in the treatment vessel. During use the final cation resin is generally saturated with ammonium ion and so the first part of the sulphuric regenerant that contacts the anion resin will be in the form of ammonium sulphate. There will be substantial conversion of the anionic sites in the anionic resin to a sulphate form and this conversion will generally be complete before free sulphuric acid can contact the anion column. Sufficient sulphuric acid is passed through the beds to ensure a high degree of regeneration of the final cation resin bed and, if present, an adequate degree of regeneration of the first cation resin bed. Typically the degree of regeneration is from 100 to 200, preferably about 150, grams per liter sulphuric acid based on the total amount of cation resin in the final and, if present, first cation resin beds.

The anion resin only is then regenerated with sodium hydroxide solution in the normal way, preferably with solution concentrations of 4 to 10%. It appears that the improved results obtainable by this regeneration process follow from the fact that the ammonium sulphate displaces monovalent anions, especially chloride, that may have arisen from condenser leakage or other sources and the sodium hydroxide then displaces remaining chloride and most at least of the sulphate.

Service flow of water through each of the beds of resin is preferably downflow and regeneration also is preferably downflow. Each bed is preferably backwashed before regeneration and air mixed and then rinsed after regeneration. The air mixing helps remove deposits that may have accumulated on the resin particles and helps expose active sites of the resin particles and makes the resin particle distribution more uniform through the bed. Regeneration may be conducted in the same vessel as service flow or in a separate vessel. A typical cycle involves downflow of water being purified, moving the resin by conventional means out of the service vessel and into a regenerant vessel, backwashing the resultant bed, regenerating it in either direction, returning the resin to the service vessel, air mixing it and rinsing it.

It is desirable that the final cation bed, and preferably all the beds, are thoroughly washed before initial use and after each regeneration before service flow starts. This is because, with the very low impurity levels achievable in the invention, residue of, for instance, sodium hydroxide regenerant solution can have a serious effect upon the impurity.

The resins used in the invention may be conventional strong acid and strong base resins. Thus they may comprise a polymeric matrix, for instance of polystyrene or a polyacrylate matrix cross linked with a diethylenically unsaturated cross linking agent such as divinyl benzene, carrying quaternary ammonium or sulphonic groups.

We have surprisingly found that in some instances the process of the invention results in a surprising increase in the content of dissolved chloride and this is undesirable. We have found that it is possible to avoid this by the use of nuclear grade resins or, more generally, by the use of resins that have been scoured with steam before use or in some other way washed thoroughly so as to remove any traces of chloride remaining from their manufacture or resins that were made by a manufacturing process that did not involve the use of an organic chlorinated solvent. Although ion exchange resins often are made using an organic chlorinated solvent processes in which such a solvent is avoided are known and are preferably used for the manufacture of the resins used in the invention.

The water to be purified may be any water of low solids content, e.g. 0.1 to 10 mg/l, usually 1 to 5 or 1 to 10 mg/l and is preferably a condensate for power station use, as discussed above. It may have a substantially neutral pH or, as is common in condensate purification processes, it may have an elevated pH, e.g. above 8 or 8.5, for instance 9 to 10, as a result of the addition of ammonia or other volatile nitrogenous base, such as morpholine or cyclohexylamine, all in conventional manner.

By the process of the invention it is easily possible to obtain very low levels of impurity even when using high pH condensate and even when there is a salt water leakage into the condensate. For instance by the invention it is possible to maintain each of sodium, sulphate and chloride below 0.1 $\mu$g/l, for instance around 0.02 $\mu$g/l so that the total contaminant level in the effluent is below 0.1 $\mu$g/l.

The beds of resin may be in separate ion exchange vessels but preferably they are all in one vessel, one above the other. Thus the process is preferably conducted with the beds being held separate from one another in a vertical tower and with the water to be treated being passed vertically through the tower. Preferably the tower includes substantially horizontal supports, of which one may be the base of the tower, and the water to be treated is passed down through the tower while preventing resin from one bed migrating to the next bed.

The invention includes also apparatus suitable for use in the described process. Such apparatus comprises means for holding the beds of resin as described, means for passing water to be treated at a fast rate through the beds in the order specified above and means for regenerating the cation and anion exchange resins separately. The beds may be in separate ion exchange vessels but preferably the apparatus comprises a vertical tower in which the beds are held separate from one another.

This apparatus is useful not only in the described process but in any process where water of low solids content is to be purified by ion exchange. Thus such apparatus can advantageously be used in condensate polishing processes that are designed to produce higher impurity levels than those desired in the process of the invention, for instance in processes that yield impurity levels of 20 to 100 $\mu$g/l. Broadly, such apparatus comprises a tower including at least two substantially horizontal supports each for supporting a bed of resin, means for passing water successively through the bed on each support and means for preventing resin from passing from one bed to the next. When the tower contains two beds one bed will be constructed to take anion exchange resin and the other cation exchange resin whilst if the tower is designed to have three beds the central bed will be of anion exchange resin and the top and bottom beds of cation exchange resin. The lower most substantially horizontal support may be the base of the tower or near the base.

The apparatus will include means for regenerating the anion and cation exchange resins separately either in the tower or outside, in which event the apparatus will include means for transporting the resins separately from the beds to the regeneration apparatus.

The means for passing water successively through the beds are such as to result in vertical passage of the water through the tower. The passage may be upflow but preferably is downflow. The beds may be arranged so that the water contacts an anion exchange bed first but preferably it contacts a cation exchange bed first.

It is known to conduct ion exchange processes in a tower containing separate layers of resin but such processes have generally involved the deliberate transport of resin from one layer to the next. However in the invention is is necessary to prevent resin passing from one bed to the next and in particular to prevent resin passing from the anion bed to any following cation bed that may be provided. Accordingly the supports used for holding the beds should prevent fines migrating from one bed to the other and the apparatus may include filters for filtering the water that is passing from one bed to the next. These filters may be positioned within the vessel or the water leaving the bottom of one bed may be taken out of the vessel, filtered and introduced to the top of the next lower bed.

Appropriate head space is preferably provided between the top of the top bed and the top of the vessel and between the top of each lower bed and the support for each upper bed.

The invention is illustrated in the accompanying drawings in which

Figure 2:
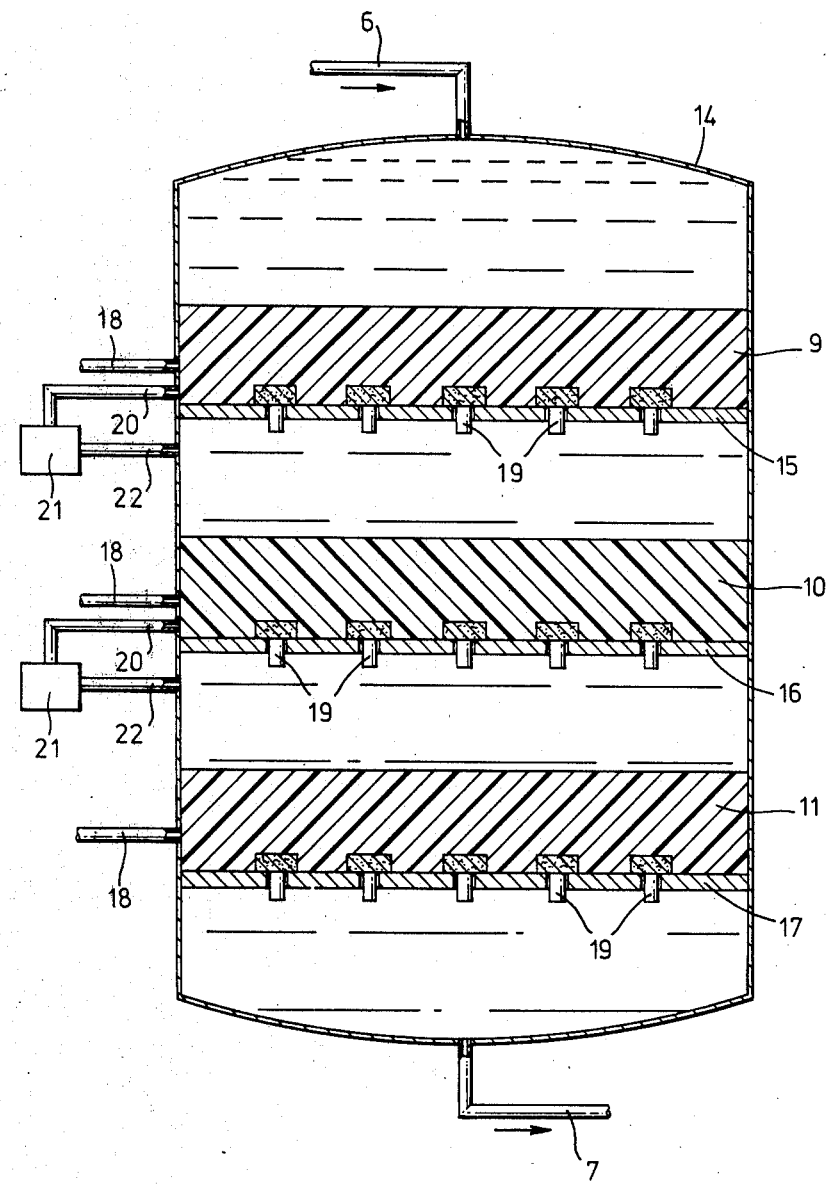

FIG. 1 illustrates diagrammatically the apparatus and process in which the resin beds are held in separate vessels and FIG. 2 illustrates an apparatus and process in which the resin beds are held in a tower.

The apparatus shown in FIG. 1 comprises columns 1, 2 and 3 connected by appropriate pipe work 4 and 5.

Water to be purified is introduced into the top of column 1 by duct 6 and the treated water is taken from the base of column 3 by duct 7.

This particular apparatus can conveniently be constructed on an industrial scale, for instance with each column from 1 to 4 meters in diameter, with the duct 6 leading from the supply of condensate, but the particular apparatus illustrated is of a laboratory test unit equipped also with inlets 7 and 8. 7 may be utilised for the introduction of ammonia so as to raise the pH of the water being treated to the level common in power station condensates and the inlet 8 may be used for the introduction of small amounts of sodium chloride so as to simulate salt water leakage into the condensate.

Column 1 contains a bed 9 of cation resin while column 2 contains a bed 10 of anion resin and column 3 contains a bed 11 of cation resin.

Each column is provided with suitable ducting 12 either for removing the resin to be regenerated to separate regeneration apparatus or for passing regenerant and rinse water through the column and with inlets 13 for introducing backwashing water and for air for air mixing.

The following are some examples of the process carried out in apparatus as illustrated.

EXAMPLE 1

The cation exchange resin used in beds 9 and 11 is a styrene DVB sulphonic acid resin that has been scoured with steam whilst the anion exchange resin is a styrene DVB quaternary ammonium resin that has been scoured with steam. The beds 9 and 11 are each about 33 cm deep and the bed 10 about 66 cm deep.

A service flow of water having a substantially neutral pH and having a dissolved solids content typical of power station condensate, e.g. varying between 1 and 10 mg/l, is introduced through duct 6 so as to pass through the vessels at a rate of 120 meters per hour, this being equivalent to 360 bed volumes per hour through columns 1 and 3 and 180 bed volumes per hour through column 2. With the resins in the hydrogen and hydroxide form this resulted in the production of water at outlet 7 having the theoretical minimum conductivity of water and having a dissolved sodium content of less than 0.1 $\mu$g/l and a total dissolved solids content of less than 1 $\mu$g/l. When the resins approached exhaustion they were regenerated, beds 9 and 11 being regenerated with sulphuric acid or hydrochloric acid and bed 10 being regenerated first with 2% aqueous sodium bicarbonate and then with about 5% aqueous sodium hydroxide. Before regeneration each bed was backwashed and after regeneration each bed was rinsed with water and air mixed.

EXAMPLE 2

The process of Example 1 was repeated whilst introducing ammonia through inlet 7 at a rate sufficient to give ammonia saturation of all three columns and a pH of about 9.6. It was found that the dissolved sodium and total solids content were about the same as in the initial test.

EXAMPLE 3

The process of Example 2 was then repeated whilst dosing sodium chloride at a rate equivalent to a sodium leakage of 1.3 mg/l through inlet 8 into the water having a pH of 9.6 and this rate of dosing and operation was continued for a period of above 5 hours. Throughout this test the dissolved sodium content leaving column 2 was always below 10 $\mu$g/l and at the outlet 7 was always below 0.1 $\mu$g/l. Total solids were also always below 1 $\mu$g/l. Acid conductivity in the water leaving outlet 7 was approximately 0.09 micromhos per centimeter at a temperature of 28° C.

EXAMPLE 4

The process of Example 1 was repeated except that when the resins approached exhaustion they were regenerated by passing sulphuric acid through beds 11, 10 and 9 (in that order) followed by aqueous sodium hydroxide through bed 10.

In these processes, instead of introducing ammonia at inlet 7 similar results may be achieved using amines such as morpholine or cyclohexylamine. Instead of regenerating in the vessels the resins may be removed from the vessels and regenerated outside.

In some instances column 1 can be omitted entirely, the inlet 6 then feeding direct into column 2.

The apparatus shown in FIG. 2 comprises a tower 14, constructed as a pressure vessel, provided with an inlet 6 and an outlet 7 and substantially horizontal support plates 15, 16 and 17. Beds 9 and 11 of cation exchange resin may be supported on the plates 15 and 17 respectively and a bed 10 of anion exchange resin may be supported on plate 16. Connections 18 for introducing and removing the resin to each bed separately are provided. Each of the plates 15, 16 and 17 may be provided with strainers 19 as illustrated, these strainers being constructed to permit the downward passage of water but to prevent the passage of resin. Alternatively at least around plate 16 and preferably also around plate 15, an outlet 20 for removing water from the bottom of the bed may be provided and may lead to a filter 21 and filtered water may then be reintroduced above the next lower bed at 22.

The resins may be regenerated within the column by appropriate design of connections, including both inlets and outlets, 18 provided always that each bed is regenerated separately, or the resins may be withdrawn from this unit through connection 18 for regeneration in external columns in conventional manner. The collecting systems and division plates used can be of various designs but are preferably designed particularly to prevent contamination of the anion resin by acids and it is important that they are designed that anion resin particles and fines do not migrate from the anion resin section into any trail cation section. Accordingly the collecting system should avoid penetration in the division plates and may take the partially treated water from the anion layer out of the vessel and through a fine filter before returning it to the trail cation layer.

In a typical process the vessel 14 is 2 meters in diameter and the resin types and bed depths are the same as described above with reference to FIG. 1. The flow rate may be less than as described above but preferably is substantially the same. The methods of regeneration and other details of the process may be the same as those given above in Examples 1 to 4 and satisfactory results are achieved.

Plate 15 and bed 9 may be omitted if slightly higher dissolved solids content at the outlet 7 can be tolerated.

Preferably the apparatus is designed for regeneration within the tower, with an inlet being provided at the base of the tower and an outlet at the top to permit sulphuric acid regenerant to be passed upflow through the three beds in series and inlets and outlets will also be provided at bed 10 to permit sodium hydroxide regenerant to be passed only through that bed.

The particle size of the resin may be conventional, for instance above 0.5 mm and usually 0.5 to 1.2 mm and most preferably 0.7 to 1.0 mm, on a wet basis. Generally when there are, as is preferred, two cation beds the same particle size is used in both and indeed the same resin particles are usually distributed between the two beds. The use of these conventional particle sizes is very advantageous since, when combined with the very high flow rate and shallow beds defined above it allows the very high purity levels to be obtained without serious problem arising from crushing of the resin. It should be noted that it is conventionally accepted that the flow rate through beds of ion exchange resins should be maintained below, for instance, 100 meters per hour as a maximum and that the depth of the bed is, typically, 1 to 1.5 meters in a mixed bed. It might have been thought that, since we were aiming for higher purity, it would be desirable to make the beds deeper but in fact in the invention we surprisingly find improved purity is obtained by making the beds relatively shallow, the total bed depth for all three beds being generally below 1.5 meters and often below 1 meter and the depth of each individual bed generally being below 75 cm and often below 50 cm. Surprisingly, by having these shallow beds and high flow rates improved purity is obtained. It has normally been considered that high flow rates must be avoided because of the risk of damaging the resins but again this is avoided in the invention by combining the high flow rates with shallow bed depths and by using resins of conventional particle size.

Anderson in U.S. Pat. No. 3,849,306 has a first shallow bed of cation exchange resin and then beds of more conventional depth of anion exchange resin and then cation exchange resin and he passes the water through these beds at conventional flow rates, for example about 60 meters per hour. He states that his first, shallow, cation bed preferably is formed of particles that are about 35 to 60 USS mesh. The use of particles of this fineness would make it difficult, and probably impossible, to achieve the very high flow rates that we use in the invention since if high flow rates were used there would probably be crushing of the particles.

To demonstrate the effect of flow rate, a series of processes were conducted at 27° C. using three beds as described above in Example 4 except that the flow rate through the beds was varied. The conductivity of water leaving the third bed was measured in $\mu S\ cm^{-1}$. The water was at a temperature of about 27° C. at which the theoretical minimum conductivity is 0.059.

When the flow rate was 60 meters per hour the conductivity was about 0.73. At 100 meters per hour the conductivity was about 0.068. At 120 meters per hour the conductivity was about 0.066. At 240 meters per hour the conductivity was about 0.062. Thus by increasing the flow rate above 120 meters per hour conductivities very close to the theoretical minimum are achieved while at lower flow rates, for instance the 60 meters per hour used in U.S. Pat. No. 3,849,306 significantly higher conductivities, and thus necessarily significantly higher impurity levels, are obtained.

We claim:

1. A process of purifying water including sulfates and chlorides having a solids content below 10 mg/l by ion exchange comprising passing the water through a bed of cation exchange resin and then through a bed of anion exchange resin and then through a final bed of cation exchange resin, the particle size of the resin in each bed being between 0.5 and 1.2 mm, in which process each bed is less than 75 cm deep, the flow rate through each bed is above 120 meters per hour, and the cation and anion exchange resins are regenerated separate from each other, thereby producing purified water having a dissolved solids content of below 5 $\mu g/l$.

2. A process according to claim 1 in which the dissolved solids content of the treated water is less than 1 $\mu g/l$.

3. A process according to claim 1 in which the first bed of cation exchange resin is 25 to 40 cm deep, the bed of anion exchange resin is 50 to 75 cm deep and the final bed of cation exchange resin is 25 to 40 cm deep.

4. A process according to claim 1 in which the flow rate through each bed is from 120 to 240 meters per hour.

5. A process according to claim 1 in which the particle size of the resin in each bed is 0.7 to 1.0 mm.

6. A process according to claim 1 in which the water contains a sufficient amount of a volatile nitrogenous base that its pH is above 8.

7. A process according to claim 1 in which the beds of resin are arranged one above the other in a vertical tower on substantially horizontal supports with the final cation bed being below the anion bed and the anion bed being below the first cation bed, and the water to be treated as passed down through the tower at a flow rate of above 120 meters per hour while migration of resin from one bed to the next is prevented.

8. A process according to claim 1 in which the anion resin and the cation resin are regenerated separately and, after regeneration, are individually air mixed in the bed through which the water to be purified will flow.

9. A process according to claim 1 in which the cation exchange resin is regenerated by contact with sulphuric acid and the anion exchange resin is regenerated by contact with the used regenerant from the cation exchange resin and then by contact with sodium hydroxide.

10. A process according to claim 1 in which the anion resin is regenerated by contact with sodium carbonate or bicarbonate and then by contact with sodium hydroxide.

* * * * *